(No Model.)
J. S. LASH.
STOVE LID LIFTER.
No. 281,278. Patented July 17, 1883.
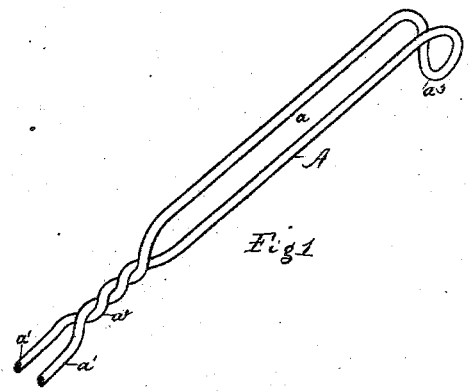
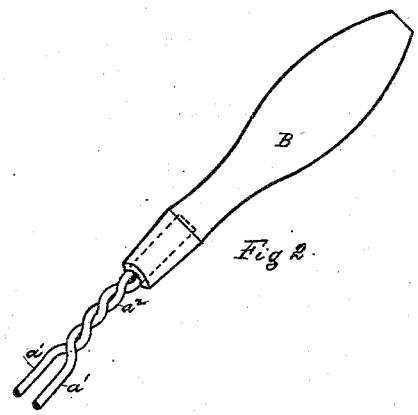
Witnesses.
Will H. Powell.
A. N. Connolly.
Inventor,
John S. Lash,
By Connolly Bros.,

UNITED STATES PATENT OFFICE.

JOHN S. LASH, OF PHILADELPHIA, PENNSYLVANIA, ASSIGNOR TO J. D. NEVINS, ANDREW FRENCH, AND C. M. RATHBURN, OF SAME PLACE, AND JAMES B. COTTON, OF CHESTER, PENNSYLVANIA.

STOVE-LID LIFTER.

SPECIFICATION forming part of Letters Patent No. 281,278, dated July 17, 1883.

Application filed November 27, 1882. (No model.)

*To all whom it may concern:*

Be it known that I, JOHN S. LASH, a citizen of the United States, residing at Philadelphia, in the county of Philadelphia and State of Pennsylvania, have invented certain new and useful Improvements in Stove-Lid Lifters; and I do hereby declare the following to be a full, clear, and exact description of the invention, reference being had to the accompanying drawings, which form part of this specification, in which—

Figure 1 is a perspective of my invention made of a single piece of wire, and Fig. 2 is a similar view of a modification.

My invention has for its object to provide a neat, strong, durable, and effective stove-lid lifter, which can be constructed at slight expense, and which will not be liable to breakage or fracture.

My invention consists of a stove-lid lifter composed of twisted wire provided with a suitable handle and constructed otherwise substantially as hereinafter set forth.

Referring to the accompanying drawings, Fig. 1 shows a stove lifter composed of a single piece of wire, A, bent to form a handle, $a$, with tines $a'$ $a'$, and twisted shank $a^2$. The handle may, if desired, and preferably should, have a crook, $a^3$, at one end, whereby the device is adapted to use also as a pot-lifter. The tines $a'$ $a'$ are blunt ended, and are adapted and designed to enter the recess or socket formed usually in stove-lids for the entrance of a lifter. Both tines enter such socket or recess when a lid is to be lifted; but when such socket or recess requires cleaning, as is frequently the case, only one tine is to be inserted for the removal of cinders, &c.

If desired, the lifter may be made with a wooden handle, B, as shown in Fig. 2, the tines in that case being made of two separate pieces of wire twisted together to form a shank. This construction affords a cold handle.

A stove lifter thus constructed may be manufactured at slight expense, is strong and durable, not liable to breakage when dropped, as a cast-iron lifter is, and, having the tines, is adapted to cleaning purposes, as hereinbefore set forth.

What I claim as my invention is as follows:

1. A stove-lid lifter composed of a twisted wire shank, flaring tines whose outer ends are terminals of the wire, and a handle, substantially as shown and described.

2. A stove-lid lifter composed of a single piece of wire bent to form a handle with twisted shank and two tines, substantially as shown and described.

3. A kitchen utensil for lifting purposes, composed of a single piece of wire bent to form a handle, having a crook at one end with a twisted shank and two tines at the other end, substantially as shown and described.

In testimony that I claim the foregoing I have hereunto set my hand this 21st day of November, 1882.

JOHN S. LASH.

Witnesses:
 LISLE STOKES,
 WILL H. POWELL.